March 19, 1963  R. E. FLEXMAN ETAL  3,081,886
CARGO CONVEYANCE MEANS
Filed Jan. 12, 1962

INVENTORS
MARVIN F. DEBOY
BY  RALPH E. FLEXMAN
Beau, Brooks, Buckley & Beau.
ATTORNEYS March 19, 1963

R. E. FLEXMAN ETAL 3,081,886

CARGO CONVEYANCE MEANS

Filed Jan. 12, 1962

INVENTORS
MARVIN F. DEBOY
RALPH E. FLEXMAN
BY Beau, Brooks, Buckley & Beau.
ATTORNEYS March 19, 1963
R. E. FLEXMAN ETAL
3,081,886
CARGO CONVEYANCE MEANS
Filed Jan. 12, 1962
3 Sheets-Sheet 3
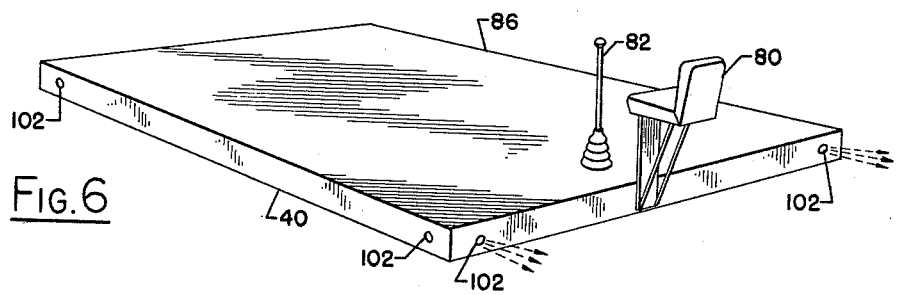
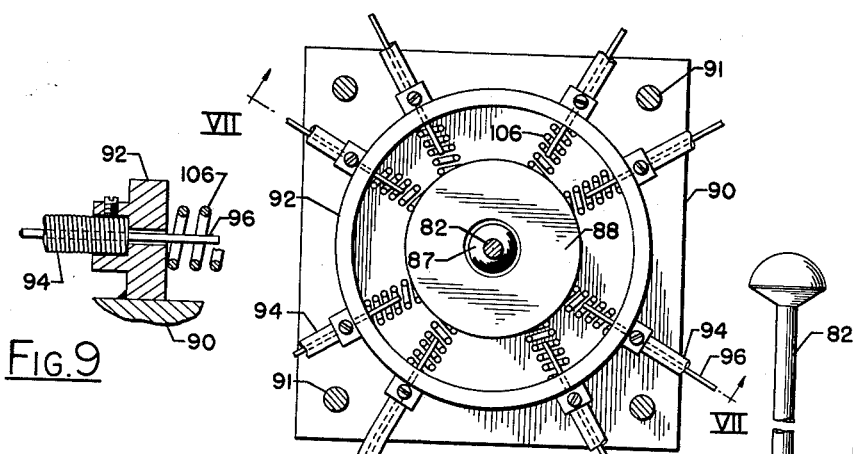
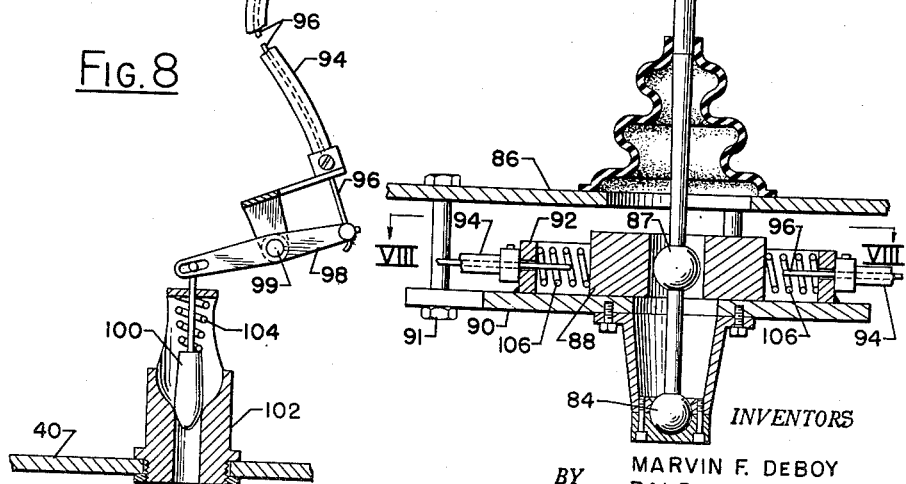
INVENTORS
MARVIN F. DEBOY
RALPH E. FLEXMAN
BY Beau, Brooks, Buckley & Beau
ATTORNEYS

United States Patent Office 3,081,886
Patented Mar. 19, 1963

3,081,886
CARGO CONVEYANCE MEANS
Ralph E. Flexman, Tonawanda, and Marvin F. De Boy, Buffalo, N.Y., assignors to Bell Aerospace Corporation
Filed Jan. 12, 1962, Ser. No. 165,771
12 Claims. (Cl. 214—1)

This invention relates to load transport systems, and more particularly to a system wherein palletized or similarly unitized loads are to be moved to and from established stations and perhaps incidentally stored, such as in connection with transfer of loads from different transport media, or in warehouse operations, or the like.

It is a primary object of the present invention to provide improved means for substantially levitating unitized loads, whereby relatively heavy loads may be manually or otherwise moved and guided from place to place, such as for example in connection with a load transfer or warehousing operation, with ease and facility comparable to the handling of extremely light weight articles.

Another object is to provide an improved system as aforesaid employing a pressurized fluid powering means, thereby avoiding use of electro-mechanical means such as in some circumstances would peril the operation.

Another object is to provide in connection with the above an improved pressured fluid control system, and an improved load propelling and guidance system.

Other objects and advantages of the invention will be apparent from the specification hereinafter including the accompanying drawing wherein:

FIG. 6 is a perspective view of another form of a load carrying pallet embodying self-propelling and guidance under manual control features;

FIG. 7 is a fragmentary vertical section on enlarged scale, of a portion of the control mechanism of FIG. 6;

FIG. 8 is a fragmentary horizontal sectional view taken along line VIII—VIII of FIG. 7; and FIG. 9 is a fragmentary sectional view taken along line IX—IX of FIG. 8.

Figure 1:
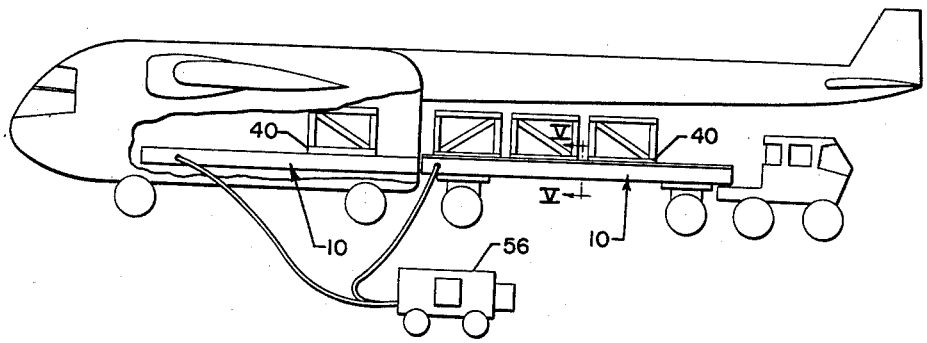
FIG. 1 is a side elevational view illustrating employment of the invention in connection with a vehicle transport arrangement.
Figure 5:
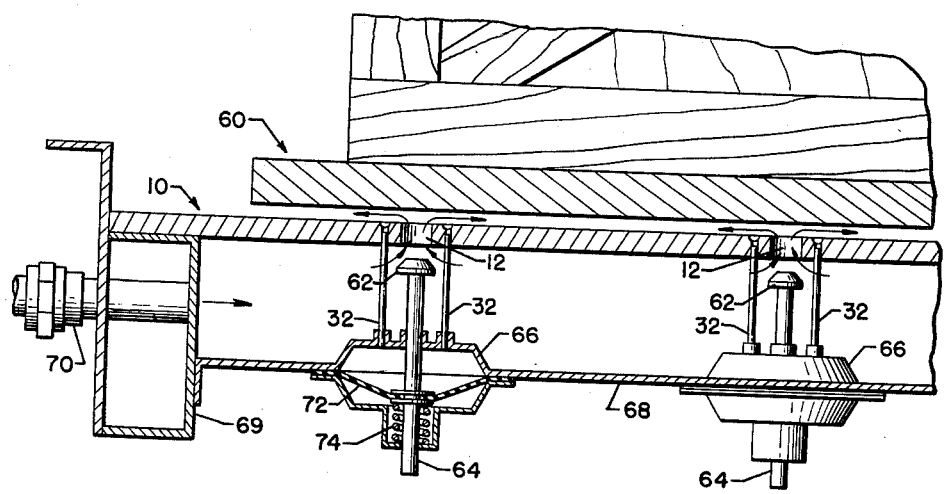
FIG. 5 is a fragmentary vertical sectional view, corresponding to FIG. 3 but showing another exemplary form of the invention.
Figures 2, 3:
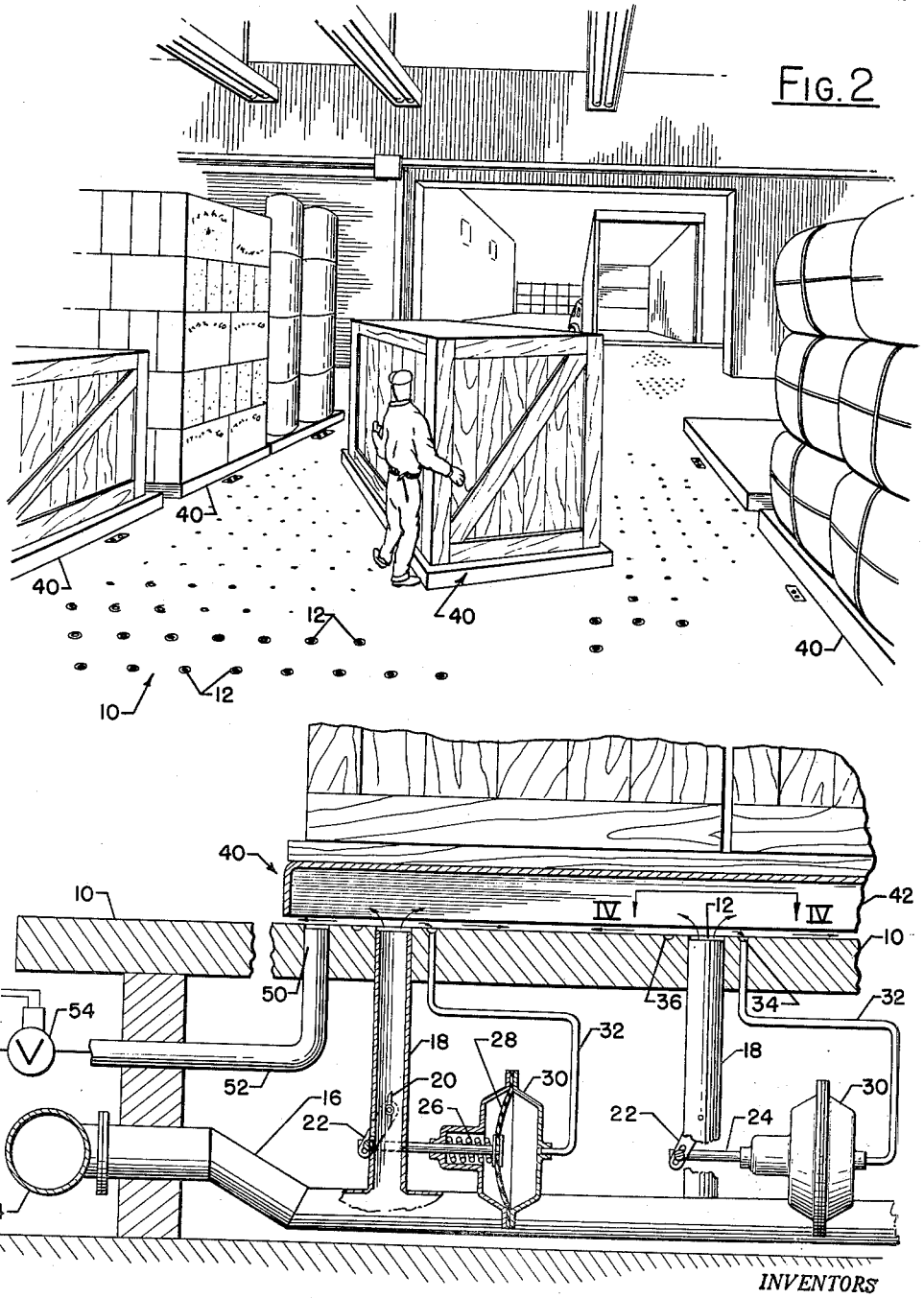
FIG. 2 is an illustrative perspective view of a warehousing operation employing a system of the present invention.
FIG. 3 is a typical fragmentary vertical sectional view through a portion of the load support flooring, showing typical operative components of the system.

As shown in FIG. 1 of the drawing herewith, the invention may be employed for example in connection with a cargo handling operation involving transfer of a load as from an aircraft to a truck or vice versa. FIG. 2 illustrates, by way of another example, use of the invention in connection with a warehousing operation. In any case the load support floor structure which is designated generally at 10 may be of any preferred construction, but in accord with the present invention that area of the floor structure which is to comprise the load travel aisleway will be of generally fluid-tight form while at appropriate intervals therealong it will be formed with openings 12 through which pressured fluid may flow (FIGS. 3, 5). Provision is made for supplying pressured fluid, such as compressed air, to the outlets 12; and such means may comprise a plenum chamber construction below the floor panel 10 into which air is pumped by any suitable means, as is well known in the art. Or, as shown in FIG. 3 herewith, the pressured fluid supply system may comprise a supply pipe 14 in communication with manifold conduits as indicated at 16 which in turn communicate with tubes 18 discharging through the openings 12 in the floor structure. By use of this system the floor structure per se need not be of strictly air-tight construction for efficient compressed air utilization.

Figure 4:
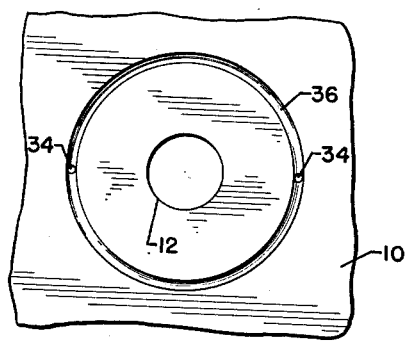
FIG. 4 is a fragmentary plan view taken as indicated along line IV—IV of FIG. 3.

In any case the fluid outlet ports in the floor panel 10 are arranged to be individually controlled as by flap valves or the like as indicated at 20 (FIG. 3) which are arranged to normally close their associated discharge ports. Thus, for example, as shown in FIG. 3, the valves 20 may be actuated by crank arms 22 connecting to push-pull rods 24 which are in turn positionally controlled by means of oppositely acting compression springs 26 and fluid-pressure responsive diaphragms 28. The diaphragms 28 are disposed in housings 30 which are connected in open communication with back pressure conduits 32 leading from inlet openings 34 at the top surfaces of the floor panel 10. As shown in FIGS. 3, 4, the openings 34 may be arranged in communication with manifold grooves 36 encircling the associated outlet port 12. In any case, the back pressure ports 34 and the associated grooves 36, if employed, will be disposed closely adjacent the associated main port 12.

The cargo loads to be handled may comprise single, relatively large, unwrapped and/or packaged items, or may comprise groups of smaller sized items; but in any case the loads will be unitized by being carried upon load pallets or the like as indicated at 40. As shown in FIG. 3 the pallet devices may be of hollow bottom form whereby to provide a bell-like chamber under each load unit. Thus it will be appreciated that the pressured fluid control system may be arranged so that whereas the control springs 26 normally hold all of the valves 20 in port-closing positions, whenever a supply of pressured fluid is admitted to the bell chamber 42 of a load pallet, the pressure thereof will back up through the conduits 32 which are at the time encompassed by the load pallet. These back pressure forces will actuate the associated diaphragms 28 to move the rods 24 against the actions of their springs 26 so as to turn the associated valve or valves to open position.

Thus, as long as the pressured fluid supply is available and the load pallet is disposed above one or more of the ports 12, the latter will discharge pressured fluid into the bell chamber 42. The relative spacings of the ports 12 and the dimensioning of the conduits and the degree of pressurization on the operative fluid will of course all be arranged and regulated according to the loads to be handled so that when pressured fluid is so dispensed into the bell under the pallet the weight of the pallet and its load will be assumed by the fluid whereby the load may be manually or otherwise pushed or pulled in the desired direction with ease and facility. It will of course be appreciated that rollers or skid runners or the like may be also provided at the under surfaces of the pallets to further facilitate horizontal movements of the load units, if desired.

It is of course a feature of the present invention that by virtue of the construction and arrangement of parts as illustrated and described hereinabove, whenever a load pallet is moved laterally away so as to uncover a previously operative port 12, the immediate lack of back pressure within the back pressure conduit 32 associated with that port permits the associated valve control spring to return its valve to port-closing position. On the other hand, as the pallet is moved over in position above an heretofore inactive port 12, the back pressure immediately developed in the associated conduit 32 will cause the control mechanism associated therewith to open the valve controlling that port, whereby that port will now assume its share of the load support operation. Thus, only those ports which are disposed under one or more load carrying pallets are operative, and automatically go into and out of operation as the load pallets are shifted over the floor; while all non-working ports are closed, thus minimizing the use of pressured fluid.

Various arrangements may be provided for initiating and terminating any required term of operation of the mechanism. For example, as shown in FIG. 3, a "starter" port as indicated at 50 may be provided at any desired location through the floor panel 10, such as at a position where a load pallet may normally be "parked." The port 50 may be served by a conduit 52 coupled to the compressed air supply and controlled as by a valve 54 which may of course be either manually or otherwise actuated. Thus, starting from in inoperative condition, the valve 54 may be momentarily opened by an attendant so as to admit compressed air to the ball chamber of the pallet to in turn operate the valve control devices of the lift ports 12 which are disposed under the pallet. The valve 54 may then be closed because the pallet may now be moved in any direction desired, and the lift ports encountered on the way will automatically open and then close behind the load pallet as it passes on.

It will be appreciated that the invention may have a variety of useful employments. For example, as illustrated in FIG. 1 of the drawing herewith, the invention may be applied to the problem of transferring heavy cargo from vehicle to vehicle. In the case illustrated the cargo carrying airplane will be supplied with a cargo support floor or aisle 10 embodying the invention as explained hereinabove, and the load truck or trailer for delivering or receiving the load from the aircraft will be similarly equipped with a cargo support floor 10 as explained hereinabove. Or, the airplane and/or the truck may be arranged to receive and/or deliver cargo from a stationary dock, or to receive and deliver from like vehicles; and in all cases either or both of the cargo handling facilities will be preferably provided with floor panels of the invention.

It is to be understood that the requisite pressured fluid supply will in most cases be most conveniently provided in the form of compressed air, and that in such case at each facility the floor structures so involved may be provided with its own air compressor and drive mechanism. For example, the airplane and the trailer truck of FIG. 1 may each carry its own air compressor machine; or, in lieu thereof a portable air compressor or the like as indicated at 56 may be provided at each load transfer depot. Then, when the vehicles arrive for load transfer purposes, hoses from the compressor may be coupled to appropriate conduit connections carried by the aircraft and the truck floor components, whereupon the devices will be activated as explained hereinabove for easy load transfer purposes.

FIG. 5 illustrates the use of a modified form of pallet designated 60 which is simply a flat bottomed structure fabricated of any suitable material and to suitable dimensions to provide a substantially rigid platform upon which the load may be stacked for transportation. FIG. 5 also depicts a modified form of lift pressure control arrangement wherein the floor openings 12 are provided with poppet type valves 62 carried by valve stems 64 which are reciprocally mounted to extend through casings 66. The casings 66 are supported by means of a plate 68 disposed parallel to the floor 10, and the floor 10 and the plate 68 are fabricated of air-tight form and margined by end enclosures 69 (FIG. 5) so as to provide an airtight plenum below the floor 10. The compressed air inlet for the plenum is indicated at 70.

As shown herein, the casings 66 enclose flexible diaphragms 72 which are centrally fixed to valve stems 64, whereby air pressure differentials at opposite sides of the diaphragms will actuate the latter so as to correspondingly displace the valve stems 64. Compression springs 74 are arranged to back up the diaphragm 72, and as previously explained, the springs 74 will be so selected as to normally bias the valves into closed positions while permitting the diaphragms to cause the valves to open whenever back pressure is transmitted through the return tubes 32 from the area adjacent the corresponding pressure outlet port 12. Hence, whenever the pallet is in position above one of the ports 12, the back pressure forces transmitting through the associated conduits 32 will cause the associated valve to open, whereby compressed air from the planeum chamber will be permitted to pass upwardly through the outlet 12 to levitate the pallet and its load, as explained hereinabove. Whereas the valve control devices have been illustrated herein as being in the form of diaphragm controlled push-pull rods, it will be appreciated that any other form of pressure differential responsive valve devices may be employed.

To "start" this system, assuming the pallet to be resting solidly on the floor and covering the area occupied by several of the outlets 12, one or more of the valves will be manually controlled to be actuated into open position. For this purpose any suitable valve stem control device may be employed, such as a mechanical linkage or an electrical solenoid (not shown) attached to certain of the valve stems and arranged to be energized from a remote control position. Thus, whenever the control device is operated so as to pull down upon the valve stem against the force of the spring 74, the port 12 will be opened to permit a blast of compressed air to enter the space between the floor and the pallet. The accompanying back pressure transmitted through the return conduits 32 will then act upon the diaphragm so as to hold the valve open as long as the pallet remains in position over said outlet port.

FIGS. 6-9 illustrate another modification wherein the load pallet 40 (constructed as shown for example in FIG. 3) is additionally equipped to be self-propelling under manual guidance by an attendant either walking beside the pallet or riding thereon as facilitated for example by provision of a chair 80 (FIG. 6). A directional control for the device may be provided as illustrated in the form of a control stick 82 which is fulcrumed by means of a universal ball and socket joint 84 (FIG. 7) to an integral portion of the pallet structure underneath the load supporting top plate portion 86 thereof. At a position above the fulcrumed connection the control stick is provided with a spherical bearing surface 87 which is encompassed by a cylindrical ring 88 which is slidably mounted upon a base plate 90 carried below the floor plate 86 as by means of bolts 91. A collar 92 is fixed to the base plate 90 as by means of welding or the like to encompass the ring 88 in spaced relation therefrom. A series of Bowden wire devices including flexible sleeves 94 and push-pull wires 96 are fixed to the collar 92 as shown in better detail in FIG. 9 in such manner that the ends of the control wires 96 extend through the collar 92 and partway toward the ring 88 (FIG. 7).

As shown in FIG. 8, the Bowden control connections into the collar 92 are at suitably spaced intervals around the collar so that motion of the control stick 82 in any direction away from upright "neutral" attitude will cause the ring 88 to move into pressure applying relation against the ends of the Bowden wires which are located in the direction of control stick movement. At their other ends the Bowden wires are connected to crank arms 98 which are fulcrumed as indicated at 99 (FIG. 8) upon stationary structure of the pallet, and the opposite ends of the crank arms pivotally connect to valve stems 100. The valves 100 are slidably related to blast discharge jet nozzles 102 which are mounted at the corner portions of the pallet so as to be directed as shown in FIG. 6. Compression springs 104 are provided behind the valves 100 so as to bias them into closed positions, and compression springs 106 are provided between the ring 88 and the collar 92 so as to bias the ring 88 toward central or "neutral" position.

Thus it will be appreciated that whenever the control stick is displaced away from upright or "neutral" attitude, the Bowden control or controls operating in the direction of control stick motion will cause the valve or valves at an appropriate corner of the pallet to open, whereby blasts of compressed air will be released to jet through the corresponding nozzles in such directions as to provide reaction forces such as are required to propel or turn the pallet, as the case may be, in the desired direction.

It is contemplated that in connection with many applications of the invention to the problem of easing the transportation of loads across horizontally disposed surfaces, the compressed air outlets will probably be uniformly spaced across the area to be serviced and that the air supplies to the outlets will be pressured to the same degree. However, in some instances it may be preferred to deviate from such an arrangement. For example, it is contemplated that some arrangements of the invention may be designed to accommodate transport of loads between floor surfaces disposed at somewhat different elevations and/or between horizontally disposed and inclined surfaces such as ramps, gangways or the like. In such cases the terminus of one floor surface may protrude above the elevation of the adjoining floor surface, and in such event the load may require lifting at the point of transfer to a somewhat higher elevation than normal above the supporting floor surface. This problem may be readily met by providing a higher degree of air pressure under the load as it approaches the obstacle to be overcome. Hence, the outlet nozzles just preceding the obstacle may be separately furnished with compessed air under a higher than normal pressure so as to cause the load unit to tilt upwardly as it moves toward the obstacle and eased over the same.

Thus it will be appreciated that whereas only a few forms of the invention and typical applications thereof have been illustrated and described in detail herein, various changes may be made therein without departing from the spirit of the invention or the scope of the accompanying claims.

We claim:

1. In cargo transport means for support of a load carrier comprising a structure adapted to receive a load to be transported, said carrier having a substantially fluid tight bottom surface and a depending skirt perimetrally thereof extending therebelow providing a bell type fluid pressure retaining chamber in the bottom of said carrier, the improvement comprising a floor structure of generally fluid tight form having fluid outlet ports therethrough at intervals throughout the area of said floor, conduit means in communication with each of said outlet ports for supplying the latter with pressure fluid, a valve device controlling flow of fluid through each of said ports, means biasing each of said valve devices toward closed position, fluid pressure responsive means connected to each of said valves and adapted to counter the action of said biasing means, and back pressure conduit means opening through said floor structure adjacent said ports and operatively coupled to said pressure responsive means for actuating the latter and opening the associated valve device whenever a fluid back pressure develops in said back pressure conduit means such as when a carrier is disposed above the location of the associated port.

2. Load handling means comprising a floor structure of generally airtight form having air outlet ports therethrough at intervals throughout the area of said floor, a load carrier comprising a structure adapted to receive a load to be transported, said carrier having an airtight bottom wall and a depending skirt perimetrally thereof extending therebelow providing a bell type air retaining chamber in the bottom of said carrier, conduit means in communication with each of said outlet ports for supplying the latter with pressured air, a valve device controlling flow of air through each of said ports, means biasing each of said valve devices toward closed positions, air pressure responsive means connected to each of said valves and adapted to counter the action of said biasing means, and back pressure conduit means opening through said floor structure adjacent said ports and operatively coupled to said pressure responsive means for actuating the latter and opening the associated valve device whenever a pneumatic back pressure develops in said air retaining chamber when said carrier is disposed above the location of the associated port.

3. In cargo transport means for support of a load carrier comprising a structure adapted to receive a load to be transported, said carrier having a substantially air tight bottom, the improvement comprising a floor structure of generally airtight form having air outlet ports therethrough at intervals throughout the area of said floor, conduit means in communication with each of said outlet ports for supplying the latter with pressured air, a valve device controlling flow of air through each of said ports, means biasing each of said valve devices toward closed position, air pressure responsive means connected to each of said valves and adapted to counter the action of said biasing means, and back pressure conduit means opening through said floor structure adjacent said ports and operatively coupled to said pressure responsive means for actuating the latter and opening the associated valve device whenever a back pressure develops in said back pressure conduit means such as when a carrier is disposed above the location of the associated port.

4. In cargo handling means for support of a load carrier comprising a structure adapted to receive a load to be transported, said carrier having a flat substantially air tight bottom, the improvement comprising a floor structure of generally airtight form having air outlet ports therethrough at intervals throughout the area of said floor, conduit means in communication with each of said outlet ports for supplying the latter with pressured air, a valve device controlling flow of air through each of said ports, means biasing each of said valve devices toward closed position, air pressure responsive means connected to each of said valves and adapted to counter the action of said biasing means, and back pressure conduit means opening through said floor structure adjacent said ports and operatively coupled to said pressure responsive means for actuating the latter and opening the associated valve device whenever a predetermined back pressure develops in said back pressure conduit when a carrier is disposed above the location of the associated port.

5. In cargo handling means for support of a cargo carrier comprising a structure adapted to receive a load to be transported, said carrier having substantially air tight bottom, the improvement comprising a floor structure of generally airtight form having air outlet ports therethrough at intervals throughout the area of said floor, a plenum chamber beneath said floor and a continuous supply of pressured air in open communication with said plenum chamber, a valve device controlling flow of air through each of said ports, means biasing each of said valve devices toward closed position, air pressure responsive means connected to each of said valves and adapted to counter the action of said biasing means, and back pressure conduit means opening through said floor structure adjacent said ports and operatively coupled to said pressure responsive means for actuating the latter and opening the associated valve device whenever an air back pressure develops in the space between said floor and a carrier bottom as when such a carrier is disposed above the location of the associated port.

6. In cargo transport means for support of a load carrier comprising a structure adapted to receive a load to be transported, said carrier having a fluid tight bottom, the improvement comprising a floor structure of generally fluid tight form having fluid outlet ports therethrough at intervals throughout the area of said floor, conduit means in communication with each of said outlet ports for supplying the latter with pressured fluid, a valve device controlling flow of fluid through each of said ports, means biasing each of said valve devices toward closed position, fluid pressure responsive means connected to each of said valves and adapted to counter the action of said biasing means, back pressure conduit means opening through said floor structure adjacent each of said ports and operatively coupled to the corresponding of said pressure responsive means for actuating the latter and opening the associated valve device only whenever a fluid back pressure develops in said back pressure conduit such as when a carrier is disposed above the location of the associated port, and a "starter" conduit controlled manually for delivering pressured fluid through a hole in said floor under a carrier.

7. Cargo transport means comprising a floor structure of generally fluid tight form having fluid outlet ports therethrough at intervals throughout the area of said floor, a load carrier comprising a structure adapted to receive a load to be transported, said carrier having a fluid tight bottom wall, conduit means in communication with each of said outlet ports for supplying the latter with pressured fluid, a valve device controlling flow of fluid through each of said ports, means biasing each of said valve devices toward closed positions, fluid pressure responsive means connected to each of said valves and adapted to counter the action of said biasing means, back pressure conduit means opening through said floor structure adjacent said ports and operatively coupled to the corresponding of said pressure responsive means for actuating the latter and opening the associated valve device only whenever a fluid back pressure develops in said back pressure conduit such as when said carrier is disposed above the location of the associated port, and a manifold groove formed in the top surface of said floor and encircling each of said ports and leading into open communication with the associated back pressure conduits.

8. In load handling means for support of a load carrier comprising a structure having a substantially air tight bottom wall and adapted to receive a load to be transported, the improvement comprising a floor structure of generally airtight form having air outlet ports therethrough at intervals throughout the area of said floor, conduit means in communication with each of said outlet ports for supplying the latter with pressured air, a valve device controlling flow of air through each of said ports, means biasing each of said valve devices toward closed position, air pressure responsive means connected to each of said valves and adapted to counter the action of said biasing means, back pressure conduit means opening through said floor structure adjacent said ports and operatively coupled to said pressure responsive means for actuating the latter and opening the associated valve device only whenever a pneumatic back pressure develops in said back pressure conduit such as when a carrier is disposed above the location of the associated port, and means under manual control for supplying pressured air between said floor and a carrier.

9. Load handling means comprising a floor structure of generally airtight form having air outlet ports therethrough at intervals throughout the area of said floor, a load carrier comprising a structure adapted to receive a load to be transported, said carrier having an airtight bottom wall and a depending skirt perimetrally thereof extending therebelow providing a bell type air retaining chamber in the bottom of said carrier, conduit means in communication with each of said outlet ports for supplying the latter with pressured air, a valve device controlling flow of air through each of said ports, means biasing each of said valve devices toward closed positions, air pressure responsive means connected to each of said valves and adapted to counter the action of said biasing means, back pressure conduit means opening through said floor structure adjacent said ports and operatively coupled to said pressure responsive means for actuating the latter and opening the associated valve device only whenever a pneumatic back pressure develops in said back pressure conduit such as when said carrier is disposed above the location of the associated port, air jet ports formed through said carrier skirt at the opposite sides and ends thereof for discharging jets of compressed air therefrom in horizontal directions, and manual control means for selectively controlling discharges of compressed air through said air jet ports.

10. Cargo transport means comprising a floor structure of generally airtight form having air outlet ports therethrough, a load carrier comprising a structure adapted to receive a load to be transported, said carrier having an airtight bell type air retaining chamber in the bottom thereof, conduit means in communication with each of said outlet ports for supplying the latter with pressured air, a valve device controlling flow of air through each of said ports, means normally biasing each of said valve devices toward closed positions, air pressure responsive means connected to each of said valves and adapted to counter the action of said biasing means, back pressure conduit means opening through said floor structure adjacent each of said ports and operatively coupled to corresponding of said pressure responsive means for actuating the latter and opening the associated valve device only whenever a pneumatic back pressure develops in the associated back pressure conduit such as when said carrier is disposed above the location of said port, air jet ports formed through the side walls of said carrier chamber at opposite sides and ends thereof for discharging jets of compressed air therefrom in horizontal directions, and manual control means mounted on said carrier for selectively controlling thrust discharges of compressed air through said air jet ports for propelling and guiding said carrier while riding on a film of flowing compressed air issuing from the air outlet ports beneath said carrier.

11. Load conveying means comprising a floor structure of generally airtight form having air outlet ports therethrough at intervals along the area of said floor, a load carrier comprising a structure adapted to receive a load to be transported, said carrier having an airtight bottom wall and a depending skirt perimetrally thereof extending therebelow providing a bell type air retaining chamber in the bottom of said carrier, conduit means in communication with each of said outlet ports for supplying the latter with pressured air, a valve device controlling flow of air through each of said ports, means biasing each of said valve devices toward closed positions, air pressure responsive means connected to each of said valves and adapted to counter the action of said biasing means, back pressure conduit means opening through said floor structure adjacent said ports and operatively coupled to said pressure responsive means for actuating the latter and opening the associated valve device only whenever a pneumatic back pressure develops in said back pressure conduit such as when said carrier is disposed above the location of the associated port, air jet ports formed through said carrier skirt for discharging jets of compressed air therefrom in horizontal directions, and means for selectively controlling discharges of compressed air through said air jet ports for load propulsion and conveying purposes.

12. In a cargo conveying means, the combination comprising a floor structure of generally airtight form having air outlet ports therethrough at intervals along the area of said floor, a load carrier comprising a structure adapted to receive a load to be transported, said carrier having an airtight bottom wall, conduit means in communication with each of said outlet ports for supplying the latter with pressured air, a valve device controlling flow of air through each of said ports, means biasing each of said valve devices toward closed positions, air pressure responsive means connected to each of said valves and adapted to counter the action of said biasing means, back pressure conduit means opening through said floor structure adjacent said ports and operatively coupled to said pressure responsive means for actuating the latter and opening the associated valve device whenever a back pressure develops in said back pressure conduit means such as when said carrier is disposed above the location of the associated port and whereby said carrier will then be supported upon a cushion of air, and means for guiding said carrier to move horizontally to transport the cargo over the areas of consecutive of said air outlet ports.

References Cited in the file of this patent

UNITED STATES PATENTS

| | | |
|---|---|---|
| 2,315,627 | Lamb | Apr. 6, 1943 |
| 2,938,590 | Barnett | May 31, 1960 |
| 2,944,684 | Dennis | July 12, 1960 |